FIG. 2

INVENTOR.
JOSEPH J. RUIZ
BY
Oberlin, Maky & Donnelly
ATTORNEYS

Fig. 4

INVENTOR.
JOSEPH J. RUIZ
BY
Oberlin, Maky & Donnelly
ATTORNEYS

United States Patent Office 3,402,017
Patented Sept. 17, 1968

3,402,017
PROCESS FOR RECOVERY OF MAGNESIUM COMPOUNDS FROM MAGNESIUM CARBONATE AND CALCIUM CARBONATE BEARING MATERIALS
Joseph J. Ruiz, Cleveland, Ohio, assignor to Basic Incorporated, Cleveland, Ohio, a corporation of Ohio
Filed Oct. 22, 1965, Ser. No. 500,999
18 Claims. (Cl. 23—67)

ABSTRACT OF THE DISCLOSURE

Magnesium carbonate trihydrate is produced from calcined dolomitic minerals by slaking the calcine and carbonating in steps to precipitate calcium carbonate and then magnesium carbonate trihydrate which is carbonated to dissolve as magnesium bicarbonate. The latter solution after separation of calcium carbonate is decarbonated to precipitate magnesium carbonate trihydrate which is calcined to form magnesium oxide.

---

This invention relates generally as indicated to a process for the recovery of magnesium compounds, and more particularly to an improved process for the separation and recovery of magnesium and calcium compounds from naturally occurring minerals such as dolomite, magnesite and other magnesium carbonate containing materials.

Magnesia, naturally occurring anhydrous magnesium carbonate (the mineral magnesite), and various hydrous magnesium carbonates such as the basic carbonates or the normal carbonate, as for example nesquehonite ($MgCO_3 \cdot 3H_2O$), have many industrial uses and applications, with one such field of utility being in the refractory industry. It is a principal object of this invention therefore to provide an improved process for recovering such compounds from naturally occurring magnesium-bearing materials such as the dolomite deposits of northwestern Ohio.

Many processes for the production of such magnesium compounds have been known heretofore, but all such processes have certain disadvantages, such as the failure to produce relatively pure compounds or the fact that they require chemicals to effect the reactions which are not economically available at the source of the ore. Other processes which have been used commercially to produce high purity magnesium compounds are uneconomical when used for large quantity production such as the production of high magnesia refractories.

A further object of this invention therefore is to provide an improved process which is particularly suitable to large-scale industrial production of relatively pure magnesium carbonates which are capable of yielding products containing better than 98 percent MgO.

It is another object of this invention to provide an improved process for the production of magnesium carbonates by the efficient use of energy in the form of heat, mechanical and electrical energy without the use of chemical reacting substances other than those found in the naturally occurring ore.

Yet another object of this invention is to provide a method for increasing the operational efficiency of continuous processes employing the physical and chemical properties of magnesium carbonates and the reactions involved in dissolving magnesium carbonate in water solutions of carbon dioxide.

An additional object of the invention is the provision of an economical process wherein the carbon dioxide gas obtained from calcination of a magnesium containing material is advantageously employed subsequently in the process to effect a recovery of desired compounds.

Still another object of the invention is the provision of a process for converting a solution of magnesium bicarbonate into the solid phase nesquehonite with the production of relatively large sized and fast settling crystals of such solid phase material.

Yet another object is the provision of an economical process for stripping carbon dioxide gas from a magnesium bicarbonate solution to form nesquehonite in which a condensible inert gas is used for effiicent recovery of such carbonate in solution.

Other objects, features and advantages of this invention will become apparent to those skilled in the art after a reading of the following more detailed description of the invention.

These and other objects are achieved by means of this invention in which an improved process for recovering magnesium compounds from magnesium carbonate bearing materials is provided which comprises the steps of calcining such a magnesium material and slaking the resulting calcine to form a slurry of magnesia and magnesium and calcium hydroxides, carbonating the slurry to selectively carbonate the calcium hydroxide and magnesium contents thereof, and subsequently separating the calcium carbonate as a precipitated solid from the magnesium bicarbonate solution and decarbonating such magnesium solution to form magnesium carbonate trihydrate ($MgCO_3 \cdot 3H_2O$) which is thereafter recovered.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawings.

In the process of this invention, many naturally occurring magnesium carbonate bearing materials are suitable, such as the aforementioned dolomite and magnesite. Other similar materials may also be used and, for purposes of this invention, the terminology "magnesium carbonate bearing material" is intended to include not only the above materials but all other suitable materials such as for example magnesium limestone. Also, the terminology "magnesium bicarbonate solution" defines a solution essentially of magnesium and bicarbonate ions in an aqueous solution, since magnesium bicarbonate occurs only as a solution of the respective ions at the temperature and pressure conditions used rather than as an isolated solid compound.

Figure 1:
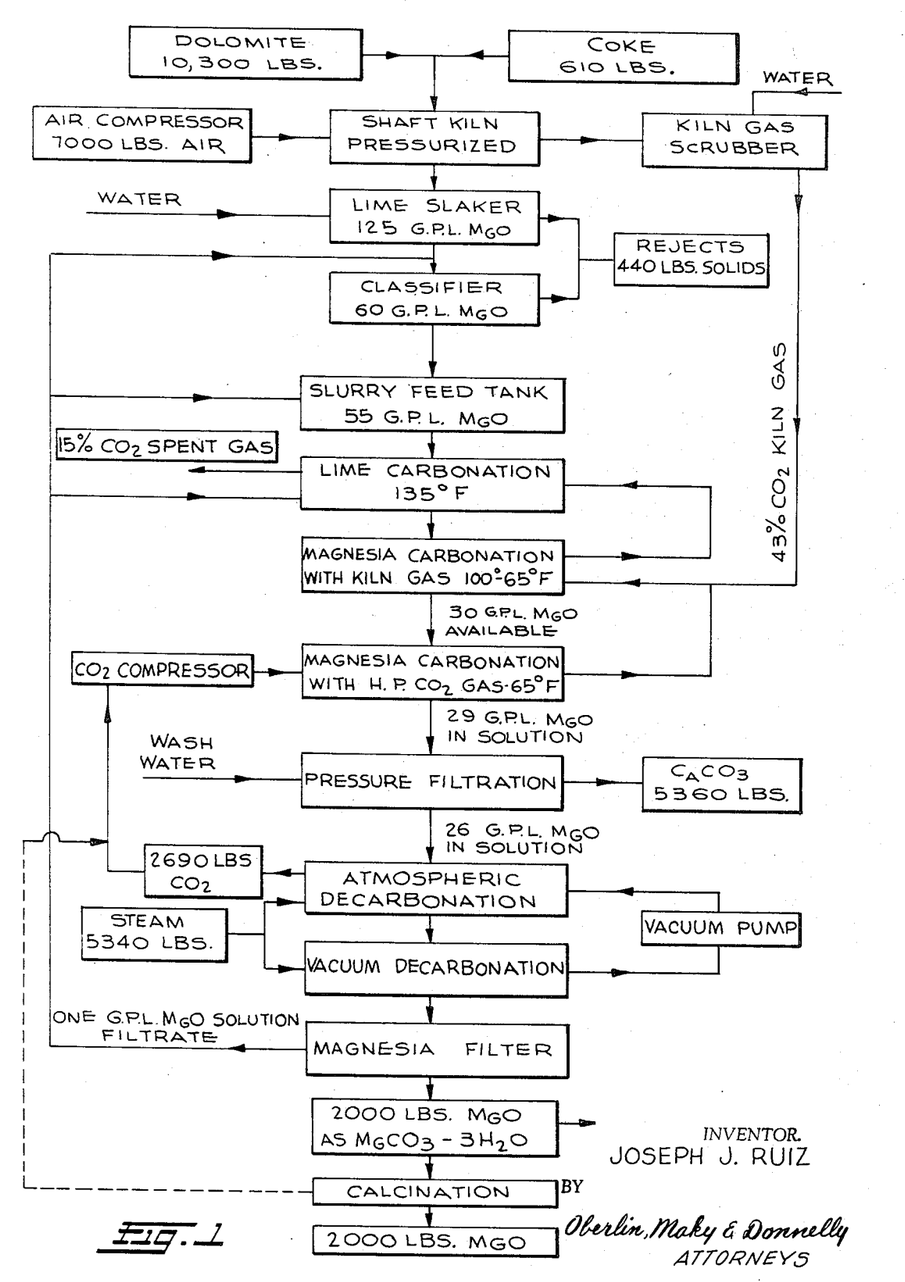
FIG. 1 is a schematic flow sheet illustrating the complete process of this invention.

Referring now more particularly to the drawings and especially to FIG. 1 thereof, the improved process of this invention is illustrated. A mixed charge of dolomite and coke (which is the fuel for the calcination) is fed into a suitable kiln and compressed air is admitted thereto. After being subjected to suitable temperature and pressure conditions for a sufficient length of time, the calcine is removed from the kiln and fed into a slaking apparatus into which water is introduced. The kiln gas, which contains substantial quantities of carbon dioxide, is removed from the kiln and fed into a carbonator for subsequent use in the process. In the slaker, the calcium oxide and a portion of the magnesium oxide contents are hydrated, after which the milk of lime slurry is fed into a classifying device in which the milk of lime is separated from any unreactive material and thereafter fed into a slurry feed tank prior to carbonation.

The first carbonation step is a line carbonation in which the calcium hydroxide is carbonated to calcium carbonate in the form of a precipitate in the slurry. After the lime carbonation, the slurry is further carbonated by use of the carbon dioxide-containing kiln gas to convert the magnesium content thereof into a dilute magnesium bicarbonate solution together with some solid magnesium carbonate trihydrate. The slurry is subsequently further carbonated with purer $CO_2$ gas under high pressure to dissolve such magnesium carbonate trihydrate to form a more concentrated magnesium bicarbonate solution.

The slurry is then filtered to remove the solid calcium carbonate precipitate, and the magnesium bicarbonate solution is thereafter decarbonated to form magnesium carbonate trihydrate and to liberate $CO_2$ gas. The magnesium carbonate trihydrate is then recovered from the slurry, after which it may be dried and used in commerce or converted into various chemicals as by calcination or roasting to produce magnesia. The $CO_2$ gas recovered from such roasting may be recycled to the magnesia carbonation for use therein, if desired, or alternatively used for the production of liquid or solid carbon dioxide.

The filtrate from this separation may be recycled for further processing as required. The carbon dioxide gas which is liberated during decarbonation is recycled to the high pressure magnesia carbonation step for use therein, as will be more fully explained.

CALCINATION

One of the principal objectives of calcining the magnesium carbonate material is to provide a magnesium compound which may be readily dissolved by carbon dioxide gas in a subsequent step of the process to provide for efficient and easy separation of the calcium and magnesium contents of such material.

There are several calcination devices commercially available for the heat treatment of such materials which may be used for the production of a calcine suitable to the present process. Since the major source of carbon dioxide in the process is derived from the calcination, however, the apparatus employed should be capable of producing such gas of suitable concentration and in sufficient quantity to sustain the process. To produce a gas having a high carbon dioxide content, the calcining apparatus should have a high fuel or heat efficiency. Rotary kilns, fluidized bed calciners and multiple-hearth furnaces are suitable for such use, but because of their relatively low thermal efficiency, the gas produced may frequently be of insufficient carbon dioxide concentration to be suitable for economical use in the present invention.

The admixed fuel shaft kiln, due to its high thermal efficiency and ability to use fuel with carbon comprising practically 100% of the combustibles, is especially suited for use in the present invention. Such kilns are particularly advantageous since their use makes it possible to recover the heat from the lime and exit gases without the use of external devices or additional equipment, and they are also well suited to keep the heat loss from the shell to a minimum.

An example of a particularly preferred kiln is that described in my earlier U.S. Patents 2,628,829 and 2,634,119. The conditions for operation of such vertical shaft kiln are fully disclosed in these patents, and reference may be made thereto for a comprehensive explanation. In general, the pressurized kiln should preferably be operated at a top temperature, such as to prevent condensation of any moisture which may be present either in the dolomite stone or the fuel for the kiln. The temperature should also be kept below about 200° F. to keep the fire low in the kiln. With charge materials which are relatively moisture-free, the top temperature may be preferably about 50° F. above the feed stone temperature.

When the kiln is operated at atmospheric pressure, the incoming feed should be of relatively large particle size, usually about 1½ inches and larger, because the draft lost through a mass of stone is progressively increased by reduction in stone size. With superatmospheric operation, however, smaller sized stone may be used since the tendency to fluidize will be reduced. In general, the smaller stone sizes are preferred since the smaller the stone the greater is the exposed surface area per unit of kiln volume, and also the smaller sized stone requires less time for calcination.

Superatmospheric pressure also permits an increase in gas mass flow which increases the heat transfer rate between the solids and gases. At the higher pressures, the heat of calcination decreases and the rate of combustion of the fuel is increased due to the increase in partial pressure of the oxygen, which results in a reduction in the kiln volume required for combustion.

As the stone size is reduced, the size of the solid fuel may also be reduced, which results in a considerable saving in fuel costs. For example, under certain conditions, it is possible to operate using coke breeze as the fuel which is low in cost in comparison to lump coke. To obtain the required quantity of carbon dioxide gas, the fuel should, however, have a high carbon content.

The carbon dioxide strength is important insofar as the carbonation steps subsequently to be described are concerned, but, in the kiln, the carbon monoxide and oxygen percentages are the guide to economical operation. For best performance the oxygen and carbon monoxide contents should be about ½ percent by volume or less for each.

Figure 2:
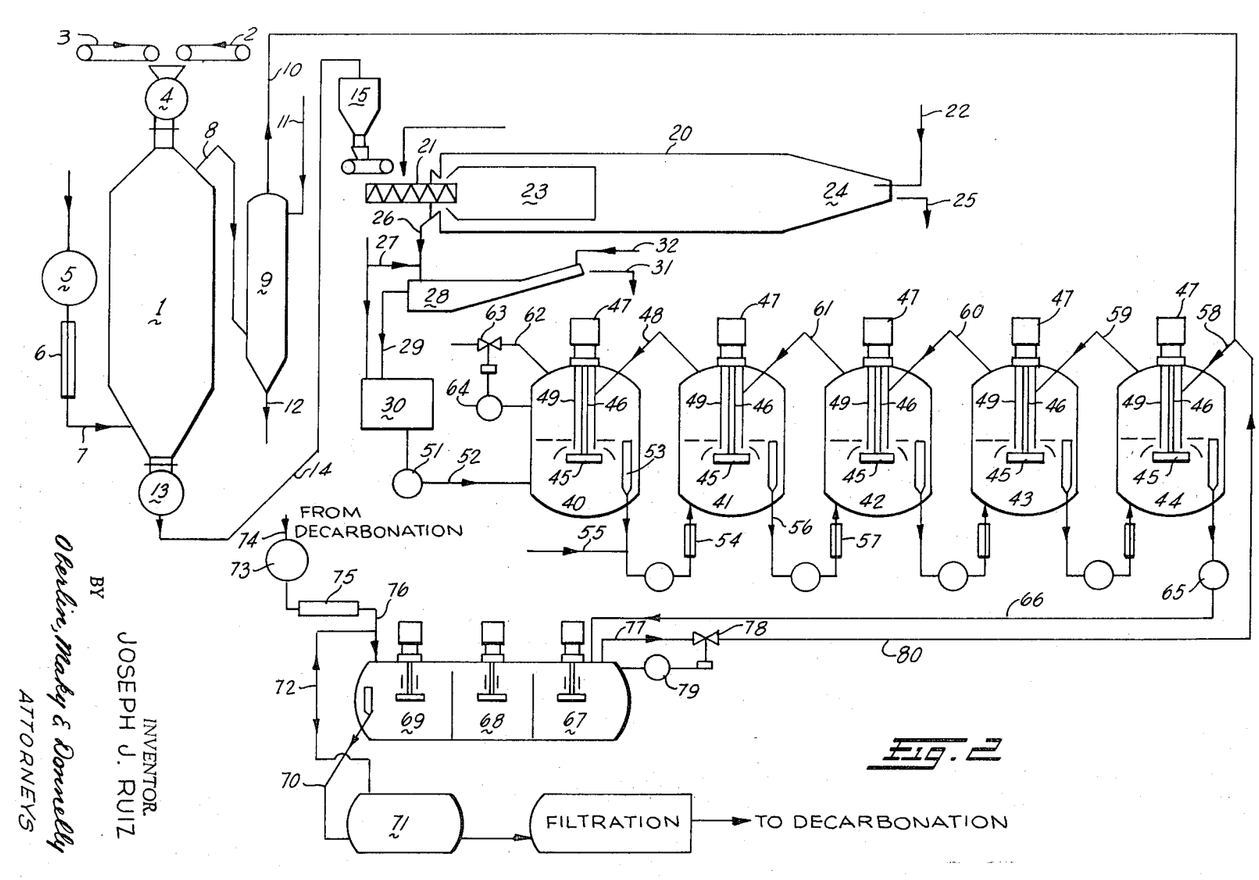
FIG. 2 is a diagrammatic illustration of a preferred arrangement of apparatus for performing the calcination, slaking, classification and carbonation steps of the process of this invention.

Referring now particularly to FIG. 2 of the drawing, the arrangement of apparatus for the calcination, slaking, classification and carbonation steps for one preferred form of the process are illustrated. As shown, a charge of raw magnesium carbonate bearing material is fed into the shaft kiln 1 by conveyor 2 and is admixed with kiln fuel, such as coke, being fed in by conveyor 3, with the mixed charge of such coke and stone being introduced into the kiln through a pressure sealing means 4.

The combustion air is compressed in compressor 5 and cooled in after-cooler 6 and is then introduced into the lower part of the kiln through pipe 7. The kiln gas flows under pressure out of the kiln through line 8 to water scrubber 9, and through line 10 to the carbonation system. Cooling and scrubbing water enters the scrubber through pipe 11, and the heated water leaves the scrubber through a suitable pressure seal and pipe 12. The calcine from the kiln flows out of the kiln through pressure sealing means 13 and is conveyed through line 14 to the slaking feed bin 15.

SLAKING AND CLASSIFICATION

The principal objective of the slaker is to prepare a milk of lime or slurry of finely suspended solids in water which is suitable to feed to the carbonation system. The lime which is produced in the pressurized kiln can generally be easily slaked on conventional equipment without the necessity of crushing, but large lump lime produced by mixed fuel kilns operated at substantially atmospheric pressure may require crushing prior to slaking.

The pebble lime is first contacted with a relatively small amount of hot water which reacts primarily with the calcium oxide to form calcium hydroxide. The heat of hydration raises the temperature of the mixture to promote further the reaction and disintegration of the pebbles, and the temperature of the water introduced may thus be adjusted so that the resulting mixture will be heated to at least approximately 200° F. and up to the boiling point by the heat of reaction. The particular water temperature which is required will depend on the heat losses from the slaker as well as the amount of water used, but in general should be about 110° F. or higher.

The quantity of water fed to the first stage of slaking should be sufficient to supply the water of hydration and to produce a thick paste of a consistency which will facilitate its movement to a second slaker stage where additional water may be introduced to form a thick milk containing approximately 280 to 300 grams per liter of CaO·MgO or about 125 grams per liter of MgO.

In the second slaking stage, all of the active lime should be disintegrated with 100 percent of the calcium oxide being hydrated and about 25 percent of the available MgO also being hydrated. The remaining pebbles which are made up of over- or under-burned material are classified out of the milk by the slaker. Part of the slaking water is introduced countercurrent to the rejected cores movement to remove the fine active material from the inactive lumps prior to discharge from the slaker.

There are several suitable slakers commercially available which may be used in the process of this invention. Illustrative examples are the pug mill type and, preferably for large capacity operations, rotary slakers. Referring again to FIG. 2, a double shell type rotary slaker is designated by the numeral 20.

As shown in FIG. 2, lime from feed bin 15 is fed to a pre-slaker or pug mill 21 into which water is introduced through line 22 to make a thick paste. The pug mill discharges such paste into the inner shell compartment 23 of the slaker where the lime contacts additional water to make a thick milk.

As mentioned, the slaker is of the rotary shell type in which the outer shell revolves on two supports and both shells are provided with flights (not shown) to move the coarser solids toward end 24 which is provided with a lifting screw to carry the unslaked materials out of the slaker through line 25. The milk of lime produced flows toward the feed end of the slaker through the annular space between the inner and outer shells and discharges from the slaker at the feed end 26.

The thick milk of lime from the slaker is diluted to a concentration of preferably 60 g.p.l. MgO prior to the classification step using water or recycled filtrate from the operation of dewatering the precipitated magnesuim compound produced later in the process.

The milk of lime is diluted through line 27 and fed into classifier 28 which is preferably of the rake type, although other such commercially available classifiers may be used, such as hydrocyclones, if desired. The milk of lime, relatively free of inerts, discharges from the classifier through line 29 and is fed into the carbonation feed tank 30. The rejected materials discharge from the classifier at the end of the rake through line 31. A small quantity of water is introduced in the discharge end of the rake through line 32 to wash the rejects and reclaim active material.

CARBONATION

In the first carbonation step, calcium hydroxide is reacted with carbon dioxide gas to produce calcium carbonate as a precipitated solid. Since the affinity of calcium hydroxide for carbon dioxide is quite high, the reaction will normally proceed at a rapid rate. The rate of reaction increases with an increase in the partial pressure of the $CO_2$ gas and also with a decrease in the temperature of the reactants.

If carbonation of the calcium hydroxide is carried out at a high rate, however, the calcium carbonate tends to precipitate as relatively small crystals, which are difficult to separate from the magnesium bicarbonate solution. To promote the crystallization of calcium carbonate having good filtration characteristics, the carbonation may be carried out at relatively high temperatures which slows down the reaction rate; but if carbonation is conducted at temperatures exceeding about 150° F., some of the magnesia may be carbonated to basic carbonates, $$3MgCO_3 \cdot Mg(OH)_2 \cdot 4H_2O$$

which due to its voluminous nature can cause serious troubles in the process.

To assist in the formation of filterable calcium carbonate crystals, the carbonation is preferably carried out in multiple units of gas absorbers of the areation-agitator type which maintain the contents of each vessel thoroughly mixed. Since the incoming feed material from the preceding vessel is quickly diffused throughout the vessel which already contains a large quantity of calcium carbonate crystals, the tendency is to increase the size of such crystals, rather than to produce showers of fine new crystals, and thus the formation of suitable crystals is achieved.

The end point of the first or calcium hydroxide carbonation is marked by a definite drop in the pH of the slurry. The hydroxide slurry, prior to carbonation, has a pH value of about 11.5 to 12.0, but upon completion of the calcium carbonation, the pH drops sharply to about 9.5.

Carbonation of the calcium hydroxide may be carried out at temperatures above 150° F. as for example about 165° F. or even higher if the pH of the slurry is maintained above the end point of about 9.5. It is preferred to maintain the pH at about 10.0 to assure successful operation of the process. To accomplish this, the quantity of $CO_2$ gas which is introduced may be regulated to control the desired end point or pH value and prevent carbonation of magnesia at the higher temperatures.

Control of the carbonation is simplified considerably if the carbonation temperature does not exceed about 145° F. since this temperature is sufficiently below the aforementioned 150° F. to preclude formation of basic carbonates and thus the reaction may be permitted to proceed without concern of the "end point" where carbonation of the calcium is completed and carbonation of magnesia begins.

The lime carbonation is preferably carried out at a relatively higher concentration of solids than that required in the subsequent carbonation since a higher concentration of solids permits a longer retention time in the carbonator which promotes the growth of calcium carbonate crystals. This also permits the introduction of a large percentage of the recycled weak MgO solution after carbonation of the calcium, since introduction before carbonation would cause reaction of the magnesium bicarbonate with the calcium hydroxide resulting in the production of magnesium hydroxide and a capacity loss in the magnesia carbonator since the magnesium hydroxide would have to be redissolved. The weak MgO solution can be admitted to the carbonator through the liquid spray nozzles therein to eliminate the troublesome foaming which frequently occurs during carbonation, particularly when it is performed in a mechanical gas dispersion absorber.

When processing dolomite, for example, a concentration of about 55 grams per liter of MgO in the slurry feed to the calcium hydroxide carbonator has proved satisfactory in aeration-agitator type equipment. A slurry concentration of about 15.6 percent by weight solids in suspension is equivalent to about 55 g.p.l. MgO.

As previously mentioned, only about 25 percent of the available magnesia is hydrated during slaking. Additional hydration may occur in the carbonation feed storage tank and upon completion of the calcium hydroxide carbonation, almost all of the available magnesia will be hydrated. Complete hydration of the magnesium oxide is not required, however, because the carbon dioxide, particularly at high concentrations, will react directly with either magnesium hydroxide or magnesium oxide.

Carbonation of magnesia is considerably more complex than carbonation of calcium since the calcium carbonation produces a solid which is not very soluble and thus does not exercise an appreciable effect on the rate of absorption of $CO_2$ gas. Carbonation of magnesia, however, involves the solution of all or parts of the product of reaction which in turn effects the absorption of $CO_2$ gas.

The carbonation of the magnesium may involve any of the following reactions:

(1) $Mg(OH)_2 + 2CO_2 \rightarrow Mg^{++}(aq) + 2HCO_3^-(aq)$ (2) $MgO + 2CO_2 + H_2O \rightarrow Mg^{++}(aq) + 2HCO_3^-(aq)$ (3) $Mg^{++}(aq) + 2HCO_3^-(aq) + Mg(OH)_2$
$+ H_2O \rightarrow 2MgCO_3 \cdot 3H_2O$ (4) $Mg^{++}(aq) + 2HCO_3^-(aq) + Mg(OH)_2$
$+ 3H_2O \rightarrow 2MgCO_3 \cdot 5H_2O$ (5) $MgCO_3 \cdot 3H_2O + CO_2 \rightleftharpoons Mg^{++}(aq)$
$+ 2HCO_3^-(aq) + 2H_2O$ (6) $Mg(OH)_2 + CO_2 + 2H_2O \rightarrow MgCO_3 \cdot 3H_2O$ (7) $MgO + CO_2 + 3H_2O \rightarrow MgCO_3 \cdot 3H_2O$ Carbonation probably begins with solution of carbon dioxide in water to form carbonic acid which in turn reacts with magnesium hydroxide to produce magnesium bicarbonate solution. The carbonic acid or carbon dioxide dissolved in water may also react with magnesium oxide directly to produce such magnesium bicarbonate solution, as shown by reaction 2.

The magnesium bicarbonate solution reacts with additional magnesium hydroxide if it is present in sufficient quantities to produce nesquehonite as shown by reaction 3, if the carbonation temperature is between about 55 to 149° F. At temperatures below about 50 to 55° F., the bicarbonate solution reacts with available magnesium hydroxide to produce $MgCO_3 \cdot 5H_2O$ (lansfordite) (reaction 4). At temperatures above 150° F., the end product of the magnesia carbonation is the objectionable basic magnesium carbonate discussed previously.

By additional carbonation, nesquehonite may be dissolved to make magnesium bicarbonate solution, as shown by reaction 5, and it is this reaction which is of significant importance in the process of this invention. The solubility of magnesium carbonate increases with a decrease in temperature and also increases with the $CO_2$ concentration which depends upon the partial pressure of the $CO_2$ gas above the solution. For example, the solubility, expressed as g.p.l. MgO in solution at one atmosphere of carbon dioxide (14.7 p.s.i. partial pressure $CO_2$) and at various temperatures, is approximately as follows:

| | G.p.l. MgO |
|---|---|
| 104° F. | 5.6 |
| 86° F. | 7.6 |
| 77° F. | 8.7 |
| 70° F. | 10.0 |
| 64° F. | 12.3 |

The solubilities at 77° F. constant temperature and at various partial pressures of $CO_2$ gas are as follows:

| | G.p.l. MgO |
|---|---|
| 74.7 p.s.i. partial pressure $CO_2$ | 23.0 |
| 134.7 p.s.i. partial pressure $CO_2$ | 28.6 |
| 150.0 p.s.i. partial pressure $CO_2$ | 31.0 |
| 214.7 p.s.i. partial pressure $CO_2$ | 32.8 |

The amount of water to be added to the slurry decreases as the concentration of the magnesium bicarbonate solution increases. Also, the heat required to carry out the subsequent decarbonation will be reduced as the quantity of water in the process is reduced. The bicarbonate solution concentration carried in the final carbonation step should preferably range from about 25 g.p.l. MgO to about 30 g.p.l. MgO.

It is possible with kiln gas to carbonate the magnesium compounds to a point where all of the available MgO which has not been dissolved is carbonated to nesquehonite, but to keep the slurry retention time in the kiln gas carbonators within reasonable limits, carbonation of all available magnesium compounds is not necessary, since the final carbonation step with a high carbon dioxide partial pressure can readily dissolve the solid magnesium compounds which remain.

On the basis of a final solution concentration from the high pressure carbonator of about 30 g.p.l. MgO, the effluent from the kiln gas carbonators preferably should have about 14 to 15 g.p.l. MgO in solution, and at least about 80 to 85 percent of the total available magnesium oxide should be carbonated, either as bicarbonate solution or as solid nesquehonite. To obtain the above conditions, the partial pressure of the $CO_2$ gas in the kiln gas should be about 30 p.s.i. or higher, and the operating temperature of the final kiln gas carbonation stage should be about 65° F. With mixed fuel shaft kiln gas containing about 43 to 44 percent $CO_2$ as will usually be the case herein, the operating pressure in the carbonation vessels should be about 53.5 to about 55.0 p.s.i.g. to obtain the desired 30 p.s.i. partial pressure.

The preferred apparatus for the kiln gas carbonation is the mechanical agitator type gas absorber in order to take advantage of higher concentrations which require higher gas pressures and increasingly smaller gas volumes. The size of the individual agitator type unit depends on the volume of gas to be dispersed, with the gas mass handled being proportional to the absolute gas pressure. The number of units in the series may be varied, being a function of the liquid retention required to carry the reaction to the desired point.

Since the incoming slurry in each vessel is quickly mixed and diffused through its contents, a certain percentage of unreacted feed would normally leave the vessel in a short period of time or be short-circuited. With multiple vessels or stages, however, this effect is counteracted, and a larger quantity of slurry may be fed for the same effective retention. In other words, the effective retention in one vessel which is fed continuously is much less than the effective retention of several vessels in series with a combined volume equal to the single unit.

The carbonation of calcium hydroxide generally requires about 94 minutes total retention in three units in series, when operating at 165° F. and at a slurry concentration of 30 g.p.l. MgO and an average of 10 p.s.i. $CO_2$ partial pressure. At an operating temperature of 135° F., and with the same concentration and $CO_2$ partial pressure, one vessel carbonates about 80 percent of the available calcium hydroxide in about 31 minutes retention time, and a second vessel operating at about 105° F. completes the carbonation of the calcium hydroxide with approximately 30 minutes retention. The carbonation in this vessel also carbonates about 10 to 15 percent of the magnesia content available.

To complete the kiln gas carbonation of the magnesia (about 85 percent of MgO available), with a slurry concentration of 30 g.p.l. MgO, requires about 95 minutes total retention time in a series of 5 vessels which are operated at an average of about 24 p.s.i. partial pressure of $CO_2$ and at temperatures ranging from about 95° F. in the first vessel to about 65° F. in the last vessel of the series.

The final carbonation step is carried out as a separate operation to take full advantage of the high concentration carbon dioxide gas which is made available in the subsequent stripping of the solution to reclaim the magnesia. Another advantage of the high pressure carbonation is its ability to readily dissolve the nesquehonite and other compounds of magnesia which, due to over- or under-burning in the kiln, are not sufficiently active to react at lower $CO_2$ concentrations.

Because of the relatively small volume of gas, the high pressure carbonation is carried out in a self-induction turbine type gas absorber in which the $CO_2$ gas is continuously drawn from the gas space above the liquid by action of the impellers, the gas which is not absorbed by the slurry being recycled back to the gas space. A plurality of stages are preferred for the reasons described previously, and since all of the stages operate at the same pressure they may be incorporated into a compact arrangement in a single vessel. The vessel is jacketed or equipped with cooling coils to maintain the desired temperature.

A three-stage, high pressure carbonator operating with a slurry concentration of 30 g.p.l. MgO at 65° F. and about 126 p.s.i. average partial pressure of $CO_2$ gas requires about 33 minutes total retention to complete the carbonation of the magnesium hydroxide, magnesia and nesquehonite to form a solution of magnesium bicarbonate.

Referring now more particularly again to FIG. 2 of the drawings, a preferred arrangement of apparatus is schematically illustrated for the desired three carbonation steps. A kiln gas carbonation system consisting of five units 40, 41, 42, 43 and 44 operates in series countercurrent to the flow of $CO_2$ gas to carry out the carbonation of the calcuim and magnesium. Although five units are shown, the number of units may be varied, depending upon the rate of production and operating conditions, such as $CO_2$ gas concentration, absolute gas pressure, slurry concentration and operating temperatures.

Each stage consists of a gas tight vessel with means to introduce the slurry to be processed and an overflow to maintain a constant liquid level. A turbine type impeller 45 is driven through shaft 46 by geared motor 47. The $CO_2$ gas enters at the top of the vessel through conduit 48 which feeds the induction tube 49 so that the carbon dioxide gas contacts intimately the incoming solution within each vessel.

In operation, the slurry which normally contains about 50 to 65 g.p.l. MgO is pumped from the feed tank 30 by pump 51 through line 52 into the first carbonator 40. About 80 percent of the available calcium hydroxide is carbonated at about 135° F. in this first stage. The effluent from the vessel overflows through overflow 53 and is pumped through cooler 54 into vessel 41. Weak recycled solution from the subsequent step of dewatering the nesquehonite is introduced through line 55 to dilute the slurry to a concentration of about 30 g.p.l. MgO as it is fed into this stage.

The second stage 41 operates at about 105° F., and carbonation of the calcium hydroxide is completed therein along with about 10 to 15 percent of the available magnesium content. The effluent from this stage flows through overflow 56 and is pumped through cooler 57 into vessel 42.

The slurry is further processed in vessels 42, 43 and 44 in the same manner as described above with the temperature being lowered from stage to stage to about 65° F. in the last kiln gas carbonation step 44. The effluent from this vessel should contain about 14.5 g.p.l. MgO in solution and about 80 to 85 percent of the total available magnesia should be carbonated as nesquehonite or magnesium bicarbonate solution.

The kiln gas which is at a pressure of about 50 to 55 p.s.i.g. is introduced via line 10 into carbonator 44 through pipe 58 and flows countercurrent to the slurry from vessel to vessel through pipes 59, 60 and 61.

The effluent gas containing about 15 percent $CO_2$ leaves the top of the vessel 40 through pipe 62 and valve 63 which is actuated by pressure controller 64 to maintain the desired gas pressure in the vessel. The pressure in the gas space of this vessel is regulated to maintain the kiln pressure and to compensate for the pressure loss through the system.

The slurry from vessel 44 is pumped to a higher pressure by pump 65 through line 66 into the first stage 67 of the pressure carbonator and proceeds through stages 68 and 69. The processed slurry flows through line 70 into the filter feed tank 71 which is maintained at the carbonator gas pressure by equalizing line 72. The strong carbon dioxide gas from the decarbonation step enters compressor 73 through pipe 74 and is compressed to about 140 p.s.i.g., after which it flows through after-cooler 75 through pipe 76 into the high pressure carbonation stage, flowing countercurrent to the slurry therein. The excess gas leaves through line 77 and valve 78 which is actuated by pressure controller 79 to maintain the gas pressure in the carbonator vessel. The excess strong gas flows through pipe 80 and into pipe 58 to enrich the kiln gas.

The slurry is removed from the filter feed tank, and thereafter the precipitated calcium carbonate is separated from the magnesium bicarbonate solution by suitable means, such as any of the commercially available high pressure filtration units. During such separation, the highly carbonated magnesium bicarbonate solution should be maintained under sufficient pressure of carbon dioxide gas to prevent precipitation of magnesium bicarbonate prior to or during the separation of calcium carbonate from the solution to maintain the efficiency recovery of MgO values. The filtration must be complete and clean to give a magnesium bicarbonate solution free of calcium carbonate as the purity of the final product will otherwise be less than desirable.

DECARBONATION

In the decarbonation step, the hydrous magnesium carbonate (nesquehonite) is precipitated from the magnesium bicarbonate solution, which provides the strong carbon dioxide gas required for the high pressure carbonation previously described. The decarbonation step reaction may be expressed by the following equation:

$$Mg^{++}(aq) + 2HCO_3^-(aq) + 2H_2O \rightarrow MgCO_3 \cdot 3H_2O + CO_2$$

This reaction generally proceeds at temperatures ranging from about 50 to 150° F. with other forms of carbonate being precipitated above and below this temperature range. The tendency of magnesium carbonate to be precipitated from a magnesium bicarbonate solution increases with an increase in the temperature of the solution. With the solution concentrations which are preferred, the maximum temperature should be generally below about 149° F. to avoid precipitation of the objectionable basic carbonates which occur at higher temperatures.

The decarbonation operation in the present invention is primarily a stripping or desorption unit operation which is carried out with the strong solution feed gradually decreasing in MgO concentration as it travels countercurrent to the carbon dioxide gas which is liberated from the solution. The $CO_2$ gas generally starts at extremely low partial pressures and gradually rises to 15 p.s.i. partial pressure as it meets the strong incoming solution.

The degree of solubility of magnesium carbonate is also a direct function of the carbon dioxide concentration in solution, and this concentration depends upon the partial pressure of carbon dioxide gas in contact with the solution.

In the decarbonation, a condensible inert gas or vapor is added to the vessels to lower the partial pressure of the carbon dioxide gas which is liberated, so that by subsequent cooling and compressing the gas, the inert vapor can be readily condensed to produce carbon dioxide gas of high concentration and purity. Since the system is operated at a constant total pressure, the inert gas addition will thus lower the partial pressure of the carbon dioxide. The preferred inert gas is water vapor, although others may be used if desired.

Figure 5:
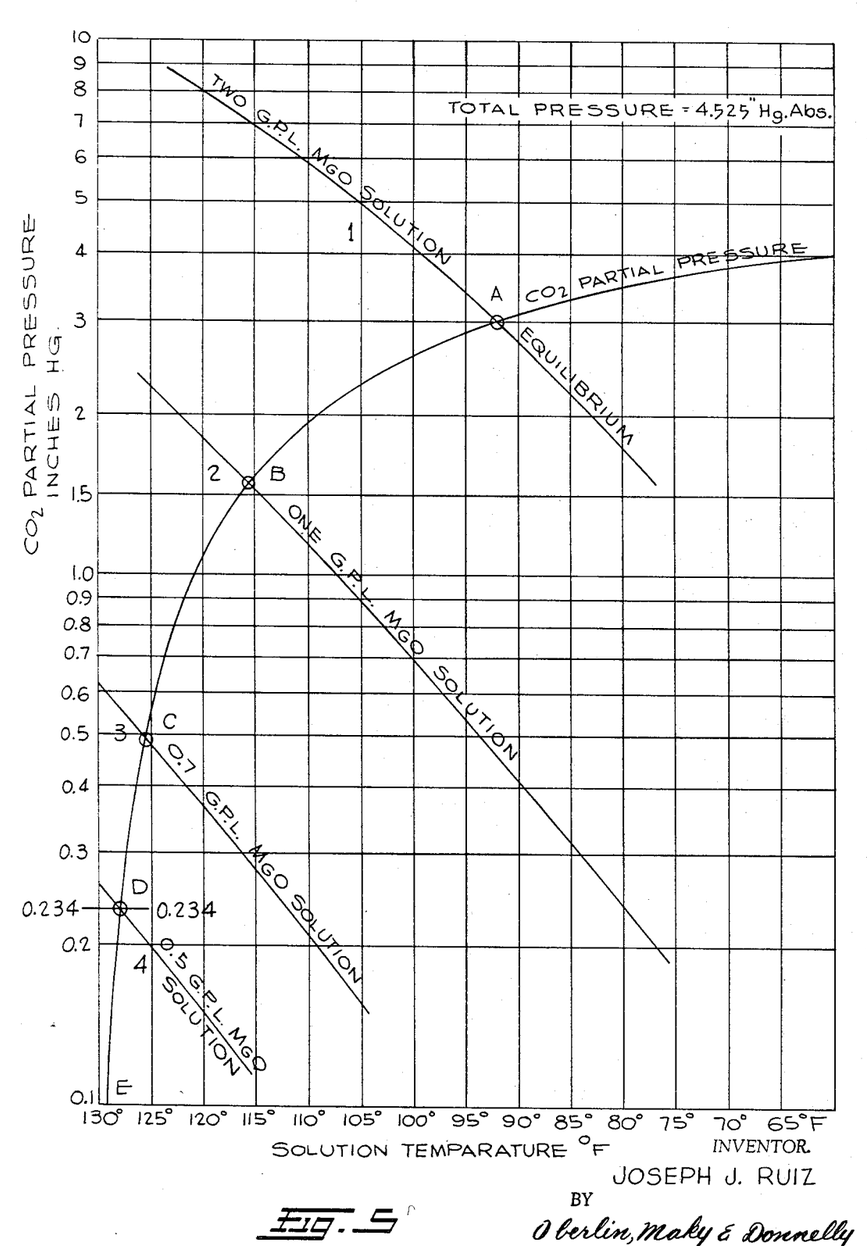
FIG. 5 is a graph indicating the relationship between the solution temperature and partial pressure of $CO_2$ gas at various MgO concentrations.

To use water vapor as a diluent for the carbon dioxide gas and to keep the maximum temperature below 149° F., the last stages of the decarbonation process are carried out at pressures below atmospheric, that is the last stages operate at an absolute pressure lower than 7.384 inches of Hg (3.627 p.s.i.) which corresponds to a boiling point of water of 149° F. However, for practical purposes to avoid formation of basic carbonate, the process is preferably operated at a temperature of about 130 to 135° F. or lower. Referring now to FIG. 5, the equilibrium conditions of carbon dioxide gas and magnesium bicarbonate solution are shown as the temperature of the vessel contents is raised by the introduction of steam. Curve ABCDE, which is labeled $CO_2$ partial pressure, represents a plot of the partial pressure of carbon dioxide gas against the temperature. This curve was obtained by subtracting the vapor pressure of water at each temperature from the total absolute pressure of 4.525 inches of Hg, which is the vapor pressure of water at 130° F., in accordance with Dalton's law.

The intersecting curves shown on the graph represent the equilibrium carbon dioxide partial pressure plotted against temperature for MgO solutions at the indicated concentrations and temperatures. Thus, it can be seen that if the temperature of the vessel contents is 92° F., the partial pressure of $CO_2$ gas will be 3.0 inches Hg, and if sufficient retention time is perimtted, the magnesium bicarbonate solution will reach equilibrium at a concentration of 2 g.p.l. MgO as indicated at Point A. If additional steam is introduced to raise the temperature to 115.5° F., the $CO_2$ partial pressure will be 1.5 inches of Hg, and the solution will reach equilibrium at a concentration of 1 g.p.l. MgO (Point B). As the temperature is raised still higher to 128° F., the solution equilibrium concentration will be 0.5 g.p.l. MgO which is Point D.

The quantity of steam to be added to the carbon dioxide gas can be determined for any given set of conditions. For example, under the operating conditions represented by Point D, at 128° F., the ratio of diluting water vapor to carbon dioxide gas will be:

$$K = \frac{PH_{20}}{PCO_2} = \frac{4.525'' - 0.234''}{0.234} = 18.33 \frac{\text{mols } H_2O}{\text{mols } CO_2}$$

$$\text{Weight ratio} = \frac{18.33 \times 18}{44} = 7.49 \frac{\#H_2O}{\#CO_2}$$

For Point E, it will be:

$$K = \frac{4.525'' - 0.1}{0.1} = 44.25 \frac{\text{mols } H_2O}{\text{mols } CO_2}$$

$$\text{Weight ratio} = \frac{44.25 \times 18}{44} = 18.1 \frac{\#H_2O}{\#CO_2}$$

If the liquid is heated further to 130° F. which is the maximum possible temperature (the boiling point of water at 4.525″ Hg) and sufficient retention time is permitted, the partial pressure of $CO_2$ gas and the equilibrium solution concentration will reach 0 at which point the water vapor to $CO_2$ ratio will be theoretically infinite.

In actual practice, the water vapor to $CO_2$ ratio may be varied considerably and depends upon the apparatus arrangement and the physical dimensions, as there is no theoretical limitation to the amount of steam that can be introduced after the solution has reached its boiling point. Also, the lowest solution concentration which is attainable depends upon the retention time permitted.

In a continuous process, however, as is used herein, equilibrium conditions will not be obtained, as the actual prevailing MgO concentration for a particular stage will always be higher than the solution concentration in equilibrium under the conditions of partial pressure of $CO_2$ gas and temperature existing in the vessel. Otherwise stated, the equilibrium partial pressure of $CO_2$ in the solution will always be greater than that of $CO_2$ in the carbon dioxide-steam mixture, and this is the driving force for the decarbonation operation.

This driving force may be expressed as the difference in the partial pressure of the carbon dioxide gas or in differences in solution concentrations or temperature. From FIG. 5, it will be appreciated that if the desired solution conceentration of the effluent from a given stage, which is maintained at 4.525 inches of Hg absolute pressure, is 2 g.p.l. MgO (Point A), the temperature of the solution must be higher than 92° F., and the partial pressure of $CO_2$ gas must be lower than 3 inches Hg. If the temperature of the vessel liquid is regulated at 125° F., the equilibrium conditions are indicated by Point C, and the driving force, expressed as $CO_2$ partial pressure difference, is:

$$\Delta f = 3.00'' - 0.50'' = 2.50'' \text{ Hg}$$

Expressed as solution conceentration the difference in driving force is:

$$\Delta f = 2.0 \text{ g.p.l.} - 0.70 \text{ g.p.l.} = 1.3 \text{ g.p.l. MgO}$$

From this discussion, it is apparent that if the stripping process of decarbonation is continued in a single stage or vessel, a large quantity of steam is necessary for dilution of the $CO_2$ gas. For example at Point E in FIG. 5, 18.1 lbs. of water vapor are required per pound of $CO_2$ gas stripped from the solution in addition to the steam needed to raise the solution temperature to 129° F. The decarbonation operation of this invention is therefore a multiple-stage operation in which the steam-$CO_2$ gas mixture is passed countercurrently to the incoming magnesium bicarbonate solution, and thus, the large amount of steam which is required in the last stages is utilized in a preceding stage. Moreover, the solution concentration in both MgO and $CO_2$ will have been reduced in the preceding stages so that the quantity of $CO_2$ gas present in each stage is also progressively reduced.

This process thus requires gas-liquid contacting equipment which has low pressure resistance to the flow of gas and vapor. To achieve this, a series of spray towers may be used but the mechanical agitator type of gas absorber which is operated as a desorber or stripper, is preferred and particularly the type which is capable of self-inducing the gas.

Figure 3:
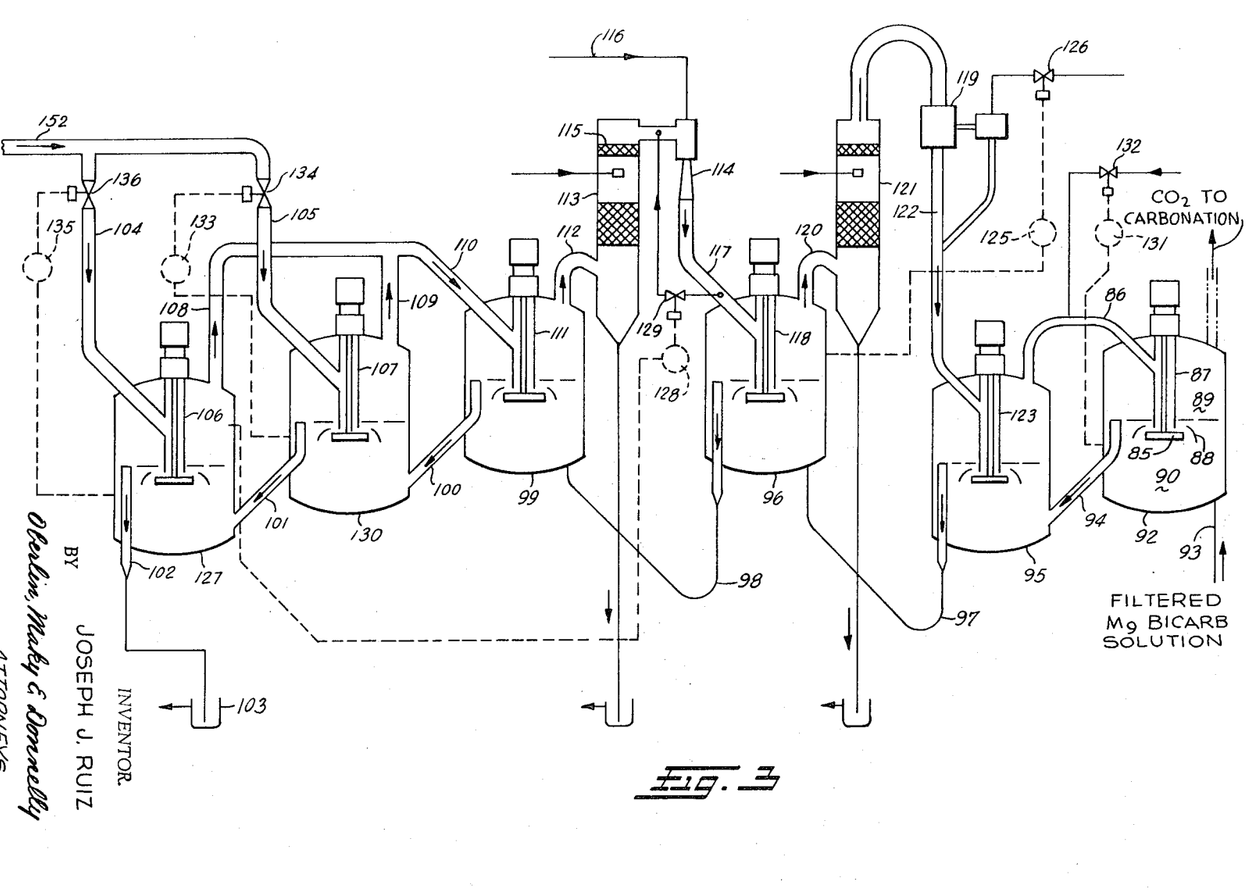
FIG. 3 is a diagrammatic illustration of a preferred system of apparatus for decarbonating the magnesium bicarbonate solution.

Referring now more particularly to FIG. 3 of the drawing, the apparatus arrangement of one form of the decarbonation operation is illustrated. A total number of 6 stages is shown, but the decarbonation may also be accomplished with a minimum of 4 stages or with any reasonable number of stages above 6.

Each stage consists of a gas-tight vessel with means to introduce the liquid to be processed and an overflow to maintain a constant liquid level. A turbine type impeller 85 is positioned in each vessel only slightly below the liquid level, which is an important factor accounting in part for the lower pressure resistance to the flow of gas and vapor through the vessel.

The gas enters the top of the vessel through a conduit 86 which fits the induction tube 87. The induction tube ends a fraction of an inch above the turbine impeller which produces the required suction to induce and disperse the gas in the liquid. A hood 88 directs the impeller discharge toward the bottom of the vessel.

The vessel height should be sufficient to allow a liquid disengaging space 89 and a liquid volume 90. The gas leaves the vessel through conduit 91. Every stage is generally identical in arrangement and size but due to the increased volume of the gas and vapor as the absolute pressure is decreased, stages operated at high vacuum should have larger gas vapor conduits and the impellers must be capable of inducing the greater volume of vapors.

The filtered magnesium bicarbonate solution coming from the calcium carbonate filtration enters the first atmospheric stage vessel 92 through feed pipe 93 and flows by gravity through conduit 94 to the second atmospheric stage 95. The liquid effluent from this vessel flows to the intermediate stage vessel 96 through pipe loop 97 which provides a liquid seal to compensate for the difference in pressure between vessels 95 and 96. Similarly, the effluent from the intermediate stage flows through loop 98 to the No. 1 high vacuum stage vessel 99 and to the following high vacuum stages by gravity through conduits 100 and 101.

The processed liquid, with the precipitated magnesium carbonate thus produced, leaves the last high vacuum stage through overflow 102 to the sealing well 103 from which it may be pumped to filters for recovery of the magnesia solids. Low pressure steam is introduced into the last two high vacuum stages through pipes 104 and 105 to the induction tubes 106 and 107. The stripping vapor and the carbon dioxide gas thus produced flow through conduits 108, 109 and 110 to the induction tube 111 of vessel 99. The gas-vapor mixture from this vessel flows through conduit 112 to scrubber condenser 113 and to ejector 114 after passing through the scrubber packing and mist eliminator 115 of the condenser. Steam is used as the motive power for the ejector which is admitted through line 116, and the carbon dioxide mixed with steam flows through pipe 117 to the induction tube 118 of vessel 96. Pump 119, which is preferably a steam-driven mechanical pump (although other compressor means may be used, such as a motor-driven pump or steam ejector), exhausts the vapor and gas from the intermediate stage vessel through conduit 120 into scrubber condenser 121. The discharge of the pump together with the steam exhaust from the engine flow through pipe 122 to the gas induction tube 123 in vessel 95. The gas from this vessel flows through pipe 86 to the induction tube in vessel 92.

The pressure in this vessel is maintained at approximately one atmosphere by controlling the input volume of the high pressure carbon dioxide compressor 73. This causes vessel 95 to operate at a few inches of water pressure greater than vessel 92.

The absolute pressure in the intermediate vessel is maintained at a constant predetermined pressure by absolute pressure controller 125 which regulates the steam valve 126 controlling the vacuum pump steam. The absolute pressure in vessel 127 is maintained at a preset pressure by controller 128 which regulated the ejector by-pass valve 129. This causes the vessel to operate at practically the same pressure as vessel 130.

The absolute pressure in vessel 99 will be lower than the controlled pressure of vessel 127 by the pressure differential required for the gas to flow from one vessel to the other.

The first 3 stages of the decarbonation operation do not require especially close temperature regulation because their normal operating temperatures are well below the boiling point temperature which corresponds to the operating pressures. In vessel 92, the liquid temperature is maintained at a preset temperature by temperature controller 131 which regulates valve 132 to admit steam to the gas induction tube. Vessel 95 is not provided with a temperature controller, but nevertheless operates in practice at a very constant temperature, because the temperature of the liquid feed is constant and the heating effect of the gas and exhaust steam from the vacuum pump depends on the pump capacity which in turn is a function of the process operating feed rate. By regulating the temperature of the liquid in vessel 92, the temperatures of the liquid in vessels 95 and 96 follows with a more or less constant temperature rise.

The high vacuum stage decarbonation vessels which operate within a few degrees of the corresponding boiling point, require close control. In vessel 130, this is achieved by temperature controller 133 which regulates valve 134 admitting low pressure steam to the induction tube. Similarly, the temperature of the liquid in vessel 127 is regulated by temperature controller 135 and steam valve 136. Vessel 99 which performs as a steam economizer, normally operates at a temperature several degrees below the boiling point without direct regulation.

In the decarbonation operation, the first two stages, operating at atmospheric pressure, produce approximately 57 to 60 percent of the total nesquehonite precipitated. The intermediate stage vessel produces approximately 20 to 23 percent, and the high vacuum stages are responsible for the remaining 20 percent. In the system illustrated, the total solids precipitated have been found to be as high as 96.2 percent of the magnesia content available in the feed solution.

Since the decarbonation effluent slurry contains approximately 8 percent solids concentration, the slurry does not require further processing as in a thickener since this concentration is sufficiently high for satisfactory recovery in a conventional continuous drum or disc vacuum filter.

The effluent gas stream will normally contain approximately 95 to 98 percent $CO_2$, with the concentration varying somewhat depending upon the particular equipment used. Concentrations within this range are considered to be extremely suitable.

Figure 4:
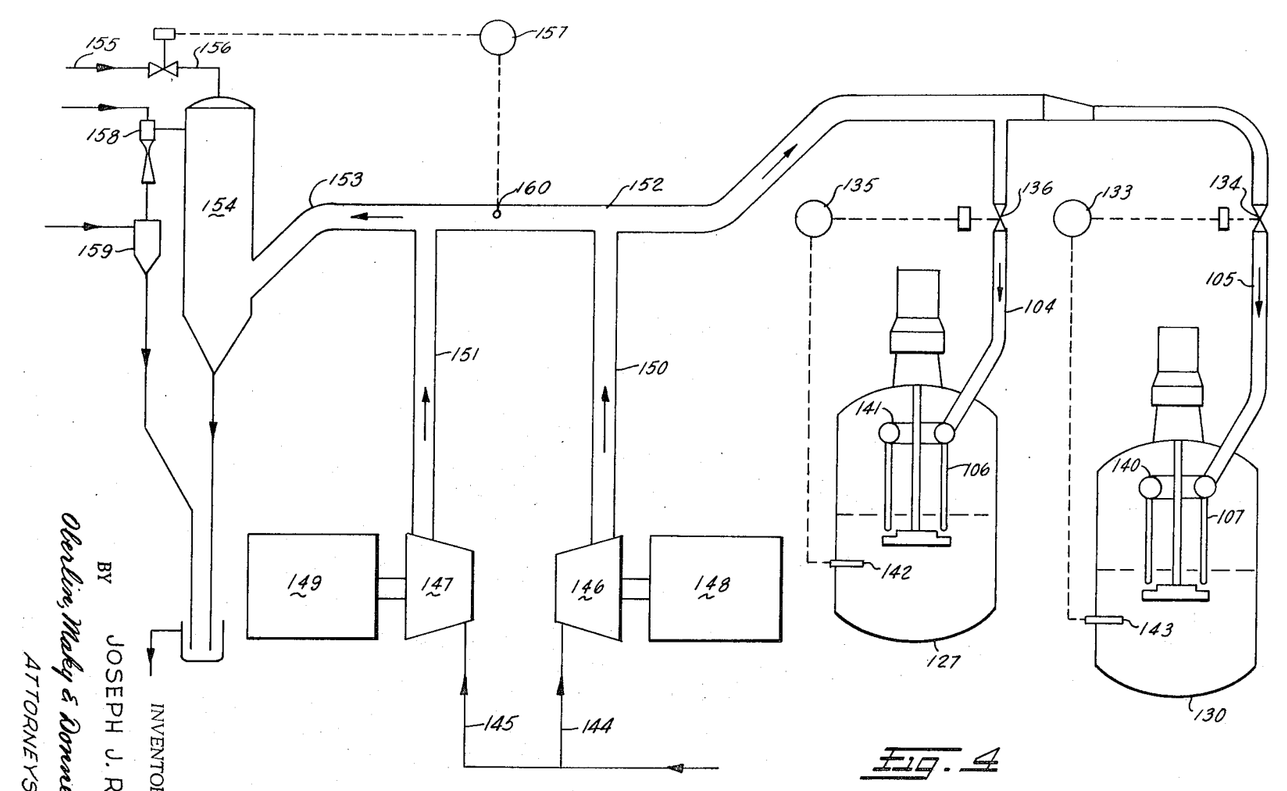
FIG. 4 illustrates diagrammatically a preferred system of apparatus for controlling the partial pressure of $CO_2$ gas.

One feature of the decarbonation step is the ability to use very low pressure steam for gas stripping and solution heating, which is capable of considerable economical importance in the generation of mechanical or electrical energy. Referring now to FIG. 4, an apparatus arrangement is illustrated for providing the necessary regulation of the temperature control, which also takes advantage of the ability of the system to use the low pressure exhaust steam.

As shown in this figure, vessels 127 and 130 represent the last two stages of the decarbonation system, with the low pressure steam flowing through conduits 104 and 105 to headers 140 and 141 and to the induction tubes 106 and 107. Valves 134 and 136 are regulated by temperature controls 133 and 135 with their temperature-sensitive bulbs 142 and 143 positioned in the liquid space of vessels 127 and 130.

High pressure steam is supplied through pipes 144 and 145 to steam turbines 146 and 147 which drive the kiln air compressor 148 and electric generator 149. The exhaust steam from the turbine flows through conduits 150 and 151 and conduit 152 to control valves 134 and 136 and/or through conduit 153 to barometric condenser 154. Cooling water is introduced into the condenser through line 155 and valve 156 which is regulated by absolute pressure controller 157. Ejector 158 with auxiliary condenser 159 exhausts the non-condensing gas from the condenser.

In operation, the temperature controls 133 and 135 are set to control the desired liquid temperature in the vessels and to adjust valves 134 and 136 to allow passage of the required quantity of exhaust steam. These valves are preferably of the butterfly type as this type of valve offers the least resistance to the flow of low pressure steam. Absolute pressure controller 157 is set to maintain the pressure at Point 160 in the exhaust steam header at a pressure sufficiently higher than the operating pressure in the vessels 127 and 130 to compensate for the resistance to the flow of steam through conduit 152, valves 134 and 136, conduits 104 and 105 and induction tubes 106 and 107.

The amount of exhaust steam from turbine 146 is a function of the kiln air requirements and is governed by the rate of operation of the process. The amount of steam normally needed to operate the kiln air compressor will be considerably less than the steam demands of the decarbonation system, but by selecting the electrical load carried by generator 149, the amount of steam exhausted by the turbine can be adjusted to supply the balance of the steam required by the decarbonation system plus some additional steam flow to provide regulation.

If the steam demand of the decarbonators is less than the amount of steam from the turbines, the pressure at Point 160 tends to increase above the preset pressure, and the controller 157 will regulate valve 156 to permit cooling water to flow into the condenser 154, which causes the excess steam to flow through line 153 and be condensed, thus readjusting the pressure at Point 160.

In a typical process operation, with the last two high vacuum stages operating at 4.525 inches of Hg absolute pressure, the pressure at Point 160 should be maintained at about 8.0 to 8.5 inches of Hg absolute pressure to compensate for resistance to the flow of steam to the decarbonation system.

In addition to the economical advantage gained by the production of power when operating with exhaust steam, the use of steam which has been reduced in pressure by expansion in an engine, rather than by throttling in a pressure reducing valve, eliminates the possibility of the product reverting to the basic carbonate due to localized high temperature at the point of introduction of the processing steam. In a typical example, with the exhaust steam pressure controlled at a maximum of 8.5 inches of Hg absolute, the saturated steam temperature will be 154.6° F., and for the conditions at the ends of the induction tubes, the temperature will be about 138° F. If steam at 10 p.s.i.g. and 250° F. (saturated temperature) is throttled by a control valve, it will be about 220° F. at the end of the induction tubes, which is 70° F. above the temperature at which the objectionable basic magnesium carbonate precipitates.

The invention will be betterr understood by reference to the following specific but non-limiting example.

Example

Following the procedure illustrated in FIG. 1 of the drawings, 10,300 lbs. of dolomite of approximately ½ to ¾" particle size were admixed with 610 lbs. of coke and fed into a pressurized vertical shaft kiln of the type described in U.S. Patent No. 2,628,829, operating at approximately 50 p.s.i.g. Approximately 7,000 lbs. of compressed air was also introduced into the kiln and the dolomite was calcined at a temperature of approximately 2500–3000° F. in about 4.5 hours total time, with about 1 hour in the hot zone.

The kiln gas produced during calcination was removed from the kiln and taken to a scrubbing device, after which it contained approximately 43 percent carbon dioxide. The $CO_2$ gas was admitted to the carbonation operation which followed.

The calcine from the kiln was slaked wherein substantially all of the calcium oxide was hydrated along with approximately 25 percent of the magnesia, and the resulting slurry contained about 125 g.p.l. MgO. The unreacted materials were removed, and the magnesia, magnesium hydroxide, calcium hydroxide slurry was diluted and fed into a rake-type classifier. The slurry was thereafter fed into a carbonation feed tank from which it was introduced into the first of five carbonation vessels. In the classifier, the concentration was approximately 60 g.p.l. MgO, and in the carbonation feed tank, it was diluted to approximately 55 g.p.l. MgO.

In the carbonation operation, the slurry was passed countercurrently to the incoming carbon dioxide gas, and the temperature within the first two carbonation vessels, wherein the lime carbonation occurred, was maintained at approximately 135° F. and 105° F. respectively. The solution was retained in the first vessel for approximately 31 minutes and in the second vessel for approximately 30 minutes. When the effluent was removed from the second vessel, substantially all of the calcium content had been carbonated and thus formed as a precipitate of $CaCO_3$.

As the slurry passed to the other carbonation vessels, carbonation of the remaining magnesium content continued. In these vessels, the temperature ranged from about 100° F. to 65° F., with the last vessel of the series being maintained at the 65° F. temperature. At the end of the kiln gas carbonation, the slurry contained precipitated calcium carbonate, magnesium bicarbonate in solution, and nesquehonite.

The slurry containing 30 g.p.l. MgO was removed from the last of the kiln gas carbonation vessels and fed into a high pressure carbonator which was maintained at a temperature of approximately 65° F. and which was fed with high pressure $CO_2$ gas obtained from the atmospheric decarbonation operation which followed. Approximately 2,690 lbs. of $CO_2$ gas was thus introduced into the carbonator.

The slurry was removed from the high pressure carbonation at a concentration of about 29 g.p.l. MgO, and was filtered whereby 5,360 lbs. of solid calcium carbonate was separated and washed to remove entrained solution. The filtrate with wash water, which had a concentration of 26 g.p.l. MgO, was then subjected to decarbonation.

In the decarbonation, the magnesium bicarbonate solution was first decarbonated in two vessels operating in series at atmospheric pressure. In this operation, approximately 5,340 lbs. of steam was introduced into the decarbonation system wherein it was admixed with carbon dioxide gas liberated therein. The temperature of the liquid gradually increased from approximately 71° F. in the first vessel to approximately 130° F., in the last high vacuum decarbonation. The three high vacuum decarbonators were operated at pressures of 3.9 inches of Hg absolute (vessel 99) and 4.525 in. Hg absolute (vessels 130 and 137).

The slurry produced by the decarbonation contained approximately 8 percent solids by weight and was filtered in a conventional drum type filter, from which approximately 2,000 lbs. of MgO in the form of nesquehonite (6,860 pounds nesquehonite) was recovered. The filtrate contained approximately 1 g.p.l. MgO, and was recycled to various stages of the process for further processing as required.

The nesquehonite was thereafter roasted in an indirect heated furnace at a temperature of approximately 2000° F. for approximately three hours after which magnesia of approximately 99 percent purity was recovered. High purity $CO_2$ was recovered and recycled to the magnesia carbonation stage.

Other modes of applying the principle of the invention may be employed, change being made as regards the details described, provided the features stated in any of the following claims, or the equivalent of such, be employed.

I, therefore, particularly point out and distinctly claim as my invention:

1. A process for recovering a magnesium compound from a magnesium carbonate and calcium carbonate bearing material comprising calcining said material, slaking the resulting calcine with water to form a slurry of magnesia, magnesium hydroxide and calcium hydroxide, carbonating the resulting slurry with $CO_2$ to produce a precipitate of calcium carbonate in a magnesium bicarbonate solution, separating said calcium carbonate precipitate from said solution, decarbonating said magnesium bicarbonate solution at atmospheric pressure to form solid magnesium carbonate trihydrate and to liberate $CO_2$ gas, further decarbonating said magnesium bicarbonate solution under high vacuum and injecting water vapor into the magnesium bicarbonate solution, flowing the resulting $CO_2$-water vapor mixture countercurrently to the flow of said bicarbonate solution in said atmospheric and vacuum decarbonation and recovering said solid magnesium carbonate trihydrate.

2. The process of claim 1 wherein said solution is agitated during decarbonation and such agitation means is placed only slightly below the liquid level therein.

3. The process of claim 1 in which the $CO_2$ gas from decarbonation is recycled to said carbonation for use therein.

4. In a process for recovering a magnesium compound from a magnesium carbonate and calcium carbonate bearing material, the steps comprising calcining said magnesium carbonate bearing material, slaking the resulting calcine with water to form a slurry of magnesia, magnesium hydroxide and calcium hydroxide, carbonating the resulting slurry with $CO_2$ to selectively convert the calcium hydroxide content thereof to calcium carbonate, further carbonating said slurry with $CO_2$ to convert the magnesium content thereof into a magnesium bicarbonate solution together with some solid magnesium carbonate trihydrate, thereafter carbonating the slurry under high pressure with $CO_2$ to dissolve said magnesium carbonate trihydrate, thereby to provide additional magnesium bicarbonate solution from said trihydrate and to carbonate any remaining magnesia content present, separating the calcium carbonate from the magnesium bicarbonate solution of said slurry, decarbonating the magnesium bicarbonate solution at atmospheric pressure to form solid magnesium carbonate trihydrate and $CO_2$ gas, further decarbonating said magnesium bicarbonate solution under high vacuum, and then recovering said solid magnesium carbonate trihydrate.

5. The process of claim 4 in which approximately 25 percent of the magnesia content of said calcined magnesium carbonate bearing material is hydrated in said slaking step.

6. The process of claim 4 wherein in said decarbonation step, the partial pressure of $CO_2$ gas liberated from the magnesium bicarbonate solution is controlled by addition of water vapor thereto, and the $CO_2$-water vapor mixture is passed countercurrently through such bicarbonate solution.

7. The process of claim 6 in which at least approximately 95 percent of the magnesia content available in the feed solution to said decarbonation is recovered.

8. The process of claim 4 in which the magnesium bicarbonate solution is agitated during decarbonation and such agitation means is positioned only slightly beneath the liquid level.

9. The process of claim 4 in which approximately 60 percent of the magnesium bicarbonate solution is decarbonated under atmospheric pressure.

10. The process of claim 4 in which the pH of said first carbonation step is above about 9.5.

11. The process of claim 10 in which the temperature in said first carbonation step is below about 145° F.

12. The process of claim 4 in which $CO_2$ gas produced in said calcination step is used in said first and second carbonation steps to convert said magnesia content into said magnesium bicarbonate solution and magnesium carbonate trihydrate.

13. The process of claim 12 in which the partial pressure of said $CO_2$ gas is at least about 30 p.s.i.

14. The process of claim 12 in which said second magnesium carbonation step includes a plurality of carbonation stages in which the temperature decreases from an initial temperature of about 100° F. to about 65° F. in the last stage thereof.

15. The process of claim 12 in which said $CO_2$ flow is countercurrent to the feed slurry.

16. The process of claim 4 in which at least approximately 80 percent of the total available magnesia content is carbonated prior to said high pressure carbonation step.

17. The process of claim 4 in which said magnesium carbonate trihydrate is subsequently roasted to produce magnesium oxide.

18. The process of claim 17 in which the $CO_2$ gas from said roasting step is recycled to said carbonation step.

References Cited

UNITED STATES PATENTS

| | | | |
|---|---|---|---|
| 2,301,457 | 11/1942 | Sadtler et al. | 23—66 |
| 2,396,915 | 3/1946 | Greider et al. | 23—67 |
| 2,455,813 | 12/1948 | Schoenlaub | 23—67 |
| 2,626,853 | 1/1953 | Armstrong et al. | 23—67 |
| 2,802,720 | 8/1957 | Opatowski | 23—67 |
| 3,320,029 | 5/1967 | Adams | 23—67 X |

OSCAR R. VERTIZ, *Primary Examiner.*

G. T. OZAKI, *Assistant Examiner.*